Jan. 9, 1951
C. L. CHURCHMAN ET AL
2,537,740
SAFETY DEVICE FOR BEER TAPPING EQUIPMENT
Filed March 24, 1947
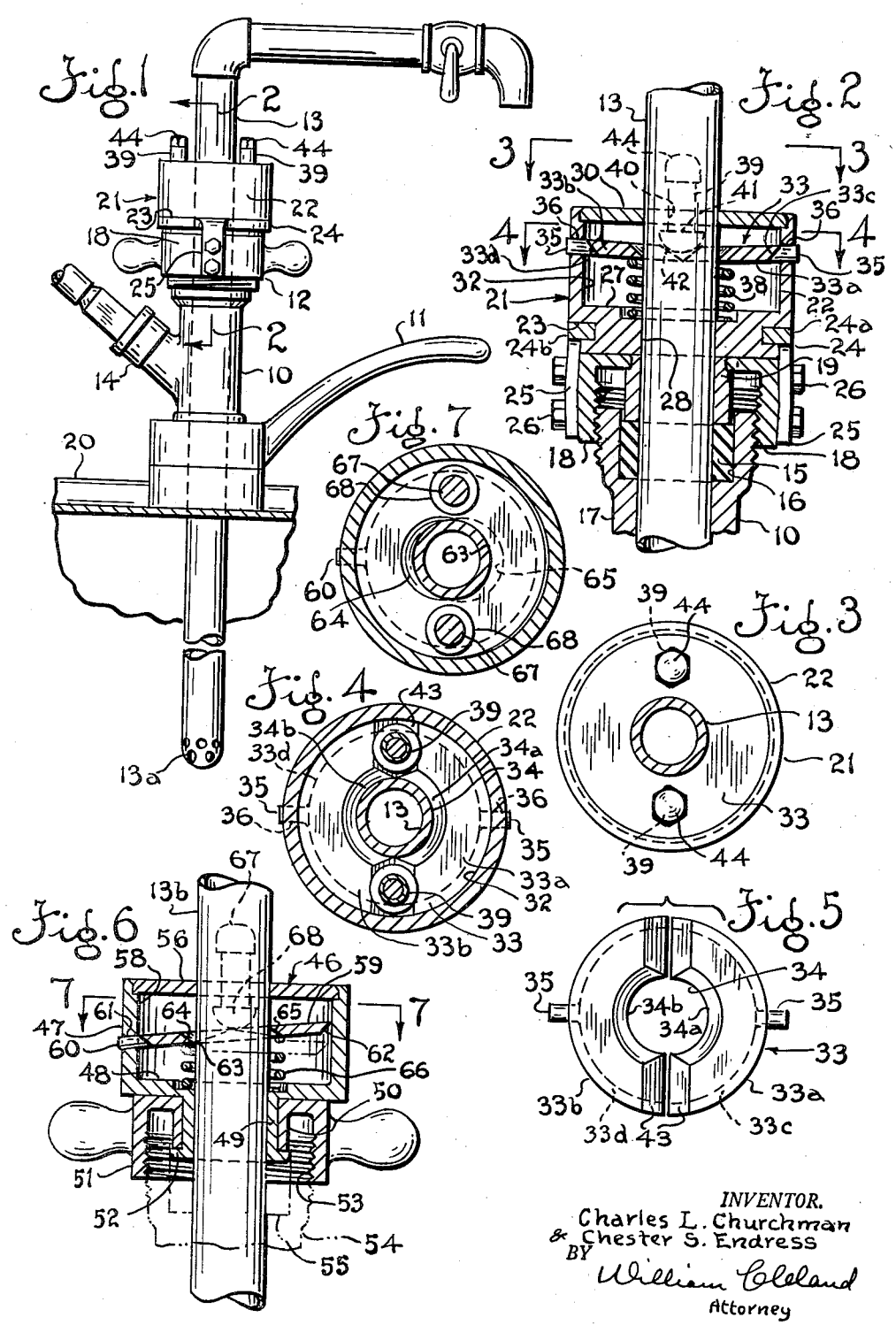
INVENTOR.
Charles L. Churchman
& Chester S. Endress
BY
William Cleland
Attorney Patented Jan. 9, 1951

2,537,740

UNITED STATES PATENT OFFICE 2,537,740

SAFETY DEVICE FOR BEER TAPPING EQUIPMENT

Charles L. Churchman, Barberton, and Chester S. Endress, Akron, Ohio

Application March 24, 1947, Serial No. 736,738

16 Claims. (Cl. 285—40)

This invention relates to a safety device for beer tapping equipment.

There is at present available on the market beer tapping equipment, including a tapping unit, quickly attachable to a beer keg as by bayonet joint means and a tubular conduit received in fluid-sealed relation through the unit for dispensing beer under air pressure from the keg. The fluid seal about the conduit is usually accomplished by means of a packing gland incorporated in the tapping device which includes a nut threaded on the unit to be operable to expand a rubber gasket against the conduit. The expanded gasket is also intended to prevent ejection of the conduit from the tapping unit caused by the internal pressure of the beer keg. Very frequently, however, this gasket becomes wet or otherwise loses its gripping efficiency and the internal pressure ejects the tubular conduit with such substantial force that in numberless instances, persons working about the equipment have been accidentally killed or seriously injured.

One object of the present invention is to provide a simple safety device for use in beer tapping equipment of the character described, by which the dispensing conduit is locked against accidental ejection from the tapping unit due to internal pressure in a beer keg to which the equipment is attached.

Another object of the invention is to provide a safety device of the character described which does not materially affect normal adjustment of the packing gland of the beer tapping unit.

Another object of the invention is to provide a safety device of the type described which is readily adapted to be incorporated in known types of beer tapping equipment without requiring material changes in the same.

These and other objects of the invention will be manifest from the following brief description and the accompanying drawings.

Of the accompanying drawings:

Figure 1 is a front elevation, partly broken away and in section, of beer tapping equipment attached to a beer keg and having the improved safety device associated therewith.

Figure 2 is an enlarged cross-section taken substantially on the line 2—2 of Figure 1.

Figure 3 is a cross-section taken on the line 3—3 of Figure 2.

Figure 4 is a cross-section taken on the line 4—4 of Figure 2.

Figure 5 is a detail view of a segmental locking disc incorporated in the safety unit.

Figure 6 is a view similar to Figure 2, illustrating a modified form of the invention.

Figure 7 is a cross-section taken on the line 7—7 of Figure 6.

Referring particularly to Figures 1 and 2 of the drawing, the numeral 10 designates a beer tapping unit of known construction, including handle means 11 for quickly attaching the unit to a bayonet joint connection (not shown) about the dispensing opening of a beer keg and also including packing gland means 12 for providing a fluid seal between the unit 10 and a tubular dispensing conduit 13, removably insertable through the unit. An inlet 14 connects the interior of the keg with a source of compressed air (not shown). The packing gland 12 of such tapping units 10 generally includes a rubber ring or gasket 15 received within a bore 16 in the outer end of fitting 17 of the unit and an internally threaded nut 18 threaded on the externally threaded outer end of fitting 17 operable to move a sleeve 19 thereof surrounding the conduit 13 inwardly to apply endwise pressure to the rubber gasket 15 to expand the same, and thereby apply fluid-sealing pressure between the fitting and the conduit.

Adjustment of the nut 18 to expand the gasket 15 ostensibly is also designed to apply sufficient pressure against the conduit 13, to prevent ejection thereof due to internal pressure of the keg, as previously described, but it has been found in the past that under certain circumstances set forth above, expansion of this gasket alone is insufficient to prevent such ejection. The present invention contemplates the provision of a safety adaptor unit 21 for releasably locking the conduit 13 against forcible ejection thereof from the beer tapping unit.

Referring particularly to Figures 2 to 5, the safety adaptor 21 may include a cylindrical housing 22 having an outwardly presented annular groove 23 for reception of halves 24a and 24b of a two-part ring 24, said halves each having an integral lug 25, secured to diametrically opposite sides of the nut 18 by means of screws 26. The arrangement is such that the housing 22 is anchored to nut 18, against the longitudinal or axial movement with respect thereto, but the nut being freely rotatable independently of the housing to permit adjustment thereof to apply said sealing pressure to the gasket 15. A closed end wall 27 of housing 22 is centrally apertured at 28 for free reception therethrough of the conduit 13, the outer end of the housing having a suitably centrally apertured closure plate 30 retained thereon as by known crimping methods.

Mounted within the cylindrical chamber 32 of the housing, in substantially spaced parallel relation to bottom wall 27 thereof, may be a two-part segmental disc member 33 having an outer diameter slightly less than the diameter of chamber 32 and also having a central aperture 34 substantially corresponding to the diameter of conduit 13, the halves or segments 33a and 33b having integral stems 35, 35 oppositely disposed on an axis at right angles to the parting line of disc 33, for relatively loose reception through diametrically opposite apertures 36, 36 in the wall of the housing 22. The arcuate marginal edges of the disc halves 33a and 33b, defined by central aperture 34, are beveled from the lower edges thereof as viewed in Figure 2, to provide oppositely arcuate knife-like edges or jaws 34a and 34b. The arrangement is such that a compression spring 38, extended between the bottom wall 27 of the housing and the underside of disc halves 33a and 33b, will tend to pivot said halves about said pivot points, upwardly toward the general plane of the disc member 33. This upward yielding action on the disc halves, provided by the spring 38, will urge the knife-like edges 34a and 34b thereof into gripping engagement with the tubular conduit 13 while the halves are out of the plane of the disc, thereby locking the conduit against forcible ejection from the tapping unit due to the internal pressure of the keg 20. The slight clearance between the disc member 33 and the wall of chamber 32 preferably is such as to permit the slight necessary pivotal movement of the disc halves, and yet maintain the same in centered relation. The pivotal action is further enhanced by provision of beveled outer edges 33c and 33d around the disc halves.

Means are provided for releasing the disc halves 33a and 33b from locking engagement with the conduit 13, to permit removal of the same from the tapping unit 10 when there is no internal pressure in keg 20. For this purpose, a pair of stems 39, 39 may be reciprocably received through apertures 40, 40 in the closure plate 30, to be at opposite sides of the conduit 13, the inner ends of the stems having thereon enlarged heads 41 providing upwardly presented shoulders for limiting outward movement of the stems, and the heads 41 being rounded at 42 for engagement in V-grooves defined by oppositely beveled edges 43, 43 of the adjoining edges of disc halves 33a and 33b. The outer ends of the two stems 39 are provided with rounded enlargements 44 engageable, as by two spread fingers of the same hand of an operator, to depress the stems and thereby urge the disc halves 33a and 33b inwardly or downwardly against the yielding action of spring 38, and thereby to release said gripping action of the disc halves against the conduit, which is then readily removable from the beer tapping unit 10. This removal of conduit 13, of course, is facilitated by a prior loosening of nut 18 to release the sealing pressure of rubber gasket 15 about the conduit.

In the use or operation of the safety device 21, rotatably anchored to the packing nut 18 of the tapping device 10, as previously described in conjunction with the use of the equipment for tapping a fresh keg 20 of beer, the nut 18 is first loosened to make sure that the rubber packing ring 15 is in uncompressed condition, and then the dispensing conduit 13 is inserted axially through the safety unit 21, the packing gland 12, and the tapping unit 10, until the perforated end 13a of the conduit projects well into the keg 20. In so inserting the end of the conduit 13 through the unit 21, engagement thereof with the tapered edges 34a and 34b of the halves 33a and 33b of disc 33 will urge said halves inwardly out of the plane of the disc against yielding action of the spring 38, and thereby relieve the gripping action of the disc halves. This action of inserting the conduit automatically removes a closure member (not shown) normally sealing the dispensing opening of the keg, in known manner, and when the conduit is fully inserted within the keg as desired, the spring 38 urging the disc halves 33a and 33b upwardly on the pivots thereof as shown in Figure 2, will cause the conduit to be gripped by the sharp arcuate jaws of the halves and thereby prevent subsequent internal pressure within the keg from ejecting the conduit during beer tapping operations. When the conduit is in this locked condition, the nut 18 may be turned upon the threaded end of fitting 17, to expand the rubber washer 15 into fluid sealing engagement with the conduit, after which compressed air may be admitted into the keg 20 through inlet connection 14 of the tapping device 10, and the keg 20 will be ready to have beer dispensed therefrom under pressure, through the conduit 13. Internal pressure of the keg tending to urge the conduit 13 outwardly only tends further to apply a gripping action to the disc halves 33a and 33b to prevent such ejection.

When the beer within the keg 20 has been fully dispensed therefrom, the conduit 13 is readily removable from the tapping unit 10, after loosening nut 18 to relieve the pressure of rubber gasket 15, by the operator simultaneously pressing inwardly on the two stems 44 with two fingers, as previously described, to urge the disc halves 33a and 33b inwardly away from the plane of the disc, against the yielding action of spring 38, and thereby to release the locking grip of the disc halves on the conduit. While so holding the stems 44 inwardly, the conduit is readily removable from the tapping equipment, and thereafter the handle 11 may be turned to remove the tapping unit 10 from the keg.

Referring particularly to Figures 6 and 7, there is illustrated a modified form of safety device 46, including a cup-shaped cylindrical housing 47 from the closed end wall 48 of which extends an integral sleeve 49 rotatably received through a sleeve 50 extending inwardly of a closed end of a cup-shaped nut 51. The free end of sleeve 49 is flanged outwardly over the free end of sleeve 50, as indicated at 52, for rotatably retaining the unit 46 and the nut together. The nut 51 shown is internally threaded at 53 to be threaded onto a fitting 54 of one standard type of beer tapping unit, to have the flange 52 forcibly engage and expand a rubber packing gasket 55 (indicated in chain-dotted lines) into fluid-sealing engagement with a conduit 13b corresponding to conduit 13. The outer end of the housing has a centrally apertured closure plate 56 retained thereon, as by crimping, for guiding reception therethrough of conduit 13b, which is also adapted to be slidably received through the aligned sleeve 49 of the housing.

Mounted within the cylindrical chamber 58 of the housing may be a one-piece disc member 59, of such slightly smaller diameter than that of the chamber to permit pivotal movement thereof in the chamber about a pin 60 extending integrally from the edge of the disc through an aperture 61 in the wall of the housing. The disc is also rotatable on the axis of pivot pin 60, which in combination, with the pivotal movement described provides a swivel action for purposes to be described. This swivel action of the disc is also facilitated by provision of a beveled edge 62 around the same.

The disc is provided with a central aperture 63 of slightly greater diameter than the conduit 13b, and one half portion of this aperture is beveled on the upper side of the disc and the other half is beveled on the underside thereof, as indicated at 64 and 65, respectively, thereby providing oppositely disposed arcuate knife-like edges in alignment with the pivot or swivel point of the disc. A compression spring 66 is provided between the bottom wall 48 of the housing and the underside of the disc 59 for urging the same upwardly on said pivot or swivel point, and thereby tending to tilt the disc toward a desired angle to apply a combined wedging and gripping action of said aligned arcuate edges about oppositely disposed portions of the conduit 13b, received through the unit. This gripping action locks the conduit against being urged outwardly of the unit by internal pressure within a beer keg to which the unit is attached (or upwardly of the unit as viewed in Figure 6).

A pair of stems 67 are reciprocably received through the closure plate 56, in a manner substantially as described in connection with Figure 2, the stems being adapted to be simultaneously depressed whereby rounded heads 68 thereon engage the disc 59 to urge the same downwardly of pivot pin 60, against the yielding action of spring 66. This releases said combined wedging and gripping action on conduit 13b to permit ready withdrawal of the same from the beer keg, as previously described. It will be readily seen that both stems 67 must be simultaneously depressed to release the disc from the conduit, because depression of one stem alone simply rotates the disc about the forementioned swivel point without releasing the opposed gripping edges from the conduit. The conduit, on the other hand, is easily insertable through the unit without manipulating the stems, because such inward insertion of the conduit tends to urge the disc out of gripping engagement therewith.

The use or operation of the modification of the invention shown and described in connection with Figures 6 and 7 is otherwise substantially as described in connection with the form of the invention illustrated in Figures 1 to 5.

Other modifications of the invention may be resorted to without departing from the spirit thereof or the scope of the appended claims.

What is claimed is:

1. In beer tapping or like equipment including a tubular conduit, and a relatively fixed part and a relatively rotatable part axially aligned therewith, said fixed and rotatable parts being apertured for reception of said conduit therethrough the combination of a safety device comprising a housing apertured to receive said conduit axially therethrough, attaching means relatively rotatable on said housing for anchoring the housing against axial movement with respect to said rotatable part of said equipment, one or more elements yieldingly shiftably mounted in said housing, and gripping portions on said element or elements for engaging said conduit to prevent axial movement thereof in one direction relatively of the housing.

2. In beer tapping or like equipment including a tubular conduit, and a relatively fixed part and a relatively rotatable part axially aligned therewith, said fixed and rotatable parts being apertured for reception of said conduit therethrough the combination of a safety device comprising a housing apertured to receive said conduit axially therethrough, attaching means relatively rotatable on said housing for anchoring the housing against axial movement with respect to said rotatable part of said equipment, one or more elements yieldingly shiftably mounted in said housing, gripping portions on said element or elements for engaging said conduit to prevent axial movement thereof in one direction relatively of the housing, and means operable at will yieldingly to shift said element or elements to release said gripping portions thereof from said conduit.

3. In beer tapping or like equipment including a tubular conduit, and a relatively fixed part and a relatively rotatable part axially aligned therewith, said fixed and rotatable parts being apertured for reception of said conduit therethrough the combination of a safety device comprising a housing centrally apertured to receive said conduit axially therethrough, connecting means for anchoring the housing against axial movement with respect to said rotatable part of said equipment, at least one element pivoted in said housing to extend radially inwardly of the longitudinal axis of the conduit, said elements having gripping jaws to move in an arc with the elements with respect to the pivots thereof and thereby being engageable with the conduit, relative axial movement of the conduit in one direction thereby tending to move said elements in corresponding axial direction to tighten the grip of said jaws on the conduit and relative movement thereof in the opposite axial direction tending to loosen said grip of said jaws.

4. In beer tapping or like equipment including a tubular conduit, and a relatively fixed part and a relatively rotatable part axially aligned therewith, said fixed and rotatable parts being apertured for reception of said conduit therethrough the combination of a safety device comprising a hollow housing having apertured opposite ends for axial guiding reception of the conduit therethrough, connecting means for anchoring the housing to said rotatable part of said equipment, a member mounted in said housing to be shiftable to change the angle thereof, said member being centrally apertured and the edge portions around the central aperture being beveled to define knife-like arcuate edges adapted to engage said conduit and wedgingly retain the same against axial movement in one direction with respect to the housing, and means for yieldingly urging said member into wedging engagements with said conduit.

5. In beer tapping or like equipment including a tubular conduit and a relatively fixed part and a relatively rotatable part axially aligned therewith, said fixed and rotatable parts being apertured for reception of said conduit therethrough the combination of a safety device comprising a hollow housing having apertured opposite ends for axial reception of the conduit therethrough, means for anchoring said housing to said rotatable part of said equipment, a segmental disc-like member mounted in said housing with each segment pivoted to the housing to pivot from and toward a plane of the member, said member being centrally apertured and the edge portions around the central aperture being beveled to define pointed arcuate edges on the segments adapted to engage around said conduit and retain the same with respect to the housing when the segments are urged toward said plane, spring means for so urging said segments toward said plane, and releasing means operable to pivot said segments outwardly of said plane against the yielding action of said spring.

6. In beer tapping or like equipment including a tubular conduit and a relatively fixed part apertured to receive the conduit therethrough, a safety device comprising a hollow housing having apertured opposite ends for axial reception of the conduit therethrough, means rotatably connected to said housing for anchoring said housing to said fixed part of said equipment and including a part attachable to said fixed part and rotatable with respect thereto, a segmental disc-like member mounted in said housing with each segment pivoted to the housing to pivot from and toward a plane of the member, said segments having gripping portions centrally of the member, adapted to wedgingly engage around said conduit and retain the same with respect to the housing when the segments are urged toward said plane, spring means for so urging said segments toward said plane, and releasing means operable to pivot said segments outwardly of said plane against the yielding action of said spring.

7. Apparatus as set forth in claim 5, said segments being halves of said disc-like member, said releasing means comprising diametrically spaced stems shiftably mounted through the housing and having inner ends thereof for engaging the half segments, said stems having ends thereof outwardly of the housing engageable to depress the stems to pivot the segments against said yielding action.

8. Apparatus as set forth in claim 5, said segments being halves of said disc-like member, said releasing means comprising diametrically spaced stems shiftably mounted through the housing and having inner ends thereof for engaging the half segments, said stems having ends thereof outwardly of the housing engageable to depress the stems to pivot the segments against said yielding action, said inner ends of said stems being rounded and each engaging between adjoining edges of the half segments.

9. In beer tapping or like equipment including a tapping unit attachable to a beer keg and having a packing gland and a nut therefor operable relatively of the unit to expand the gland packing around a tubular conduit received axially through the gland and tap, a safety device for preventing ejection of said conduit from the tapping equipment due to internal pressure in the keg, said device comprising a housing centrally apertured to receive said conduit therethrough, attaching means relatively rotatable on said housing for anchoring the housing against axial movement with respect to said nut but permitting relative rotation thereof with respect to the nut about said axis thereof, a plurality of elements shiftably mounted in said housing, and gripping portions on said elements for engaging said conduit to prevent said ejection thereof outwardly of the housing, said nut thereby being rotatable to adjust said gland without relative rotation of said housing.

10. The combination as set forth in claim 9, including spring means for yieldingly urging said elements into said gripping engagement with said conduit, means operable at will against said spring means to relase said elements from said gripping engagement with the conduit.

11. In beer tapping or like equipment including a tubular conduit and a relatively fixed part, a safety device comprising a housing apertured to receive said conduit axially therethrough, a nut having means for rotatably connecting the same to said fixed part, means for anchoring said housing to said nut to be relatively rotatable thereon, an element shiftably mounted in said housing, and gripping portions on said element for engaging said conduit to prevent longitudinal movement thereof in one direction relatively of the housing.

12. A safety device as set forth in claim 11, said element comprising a plate pivotally connected at one side of said housing, said plate having a central aperture for reception therethrough of said conduit, opposite edge portions of said central aperture of the disc constituting said gripping portions engageable with the conduit, when said plate is pivoted to change the angular gripping position thereof, and means yieldingly urging said plate toward said angular gripping position.

13. A safety device as set forth in claim 12, said opposite portions of said plate being aligned with the pivotal connection thereof and being oppositely beveled with respect to the plane of the plate to provide knife-like gripping edges.

14. A safety device as set forth in claim 13, including releasing means operable to pivot said plate away from said gripping position thereof against the action of said yielding means.

15. A safety device as set forth in claim 14, said releasing means comprising diametrically spaced stems shiftably mounted through said housing and having inner ends for engaging said plate and said stems having outward extensions engageable to depress the stems to pivot said plate against said yielding means.

16. A safety device as set forth in claim 15, said plate being pivotally so connected to the housing to be rotatable about an axis through the pivot point as well as to swing toward and from said gripping angle thereof, said stems being positioned at opposite sides of said axis.

CHARLES L. CHURCHMAN.
CHESTER S. ENDRESS.

REFERENCES CITED

The following references are of record in the file of this patent:

UNITED STATES PATENTS

| Number | Name | Date |
| --- | --- | --- |
| 228,069 | Heidle | May 25, 1880 |
| 784,994 | Durafort | Mar. 14, 1905 |
| 1,227,941 | Sauvage | May 29, 1917 |
| 1,802,673 | Sauvage | Apr. 28, 1931 |
| 2,392,477 | Holm | Jan. 8, 1946 |

FOREIGN PATENTS

| Number | Country | Date |
| --- | --- | --- |
| 205,994 | Great Britain | Nov. 1, 1923 |